(12) United States Patent
Ashmore

(10) Patent No.: US 8,441,778 B1
(45) Date of Patent: May 14, 2013

(54) MODULAR SUBSTATION FEEDER ASSEMBLY

(76) Inventor: Stephen L. Ashmore, Midland, TX (US)

(*) Notice: Subject to any disclaimer, the term of this patent is extended or adjusted under 35 U.S.C. 154(b) by 346 days.

(21) Appl. No.: 12/976,474

(22) Filed: Dec. 22, 2010

(51) Int. Cl.
*H02B 1/00* (2006.01)
*H01H 33/59* (2006.01)

(52) U.S. Cl.
USPC .................... 361/601; 361/602; 307/113

(58) Field of Classification Search .......... 361/602, 361/603, 605, 620, 621; 218/45
See application file for complete search history.

(56) References Cited

U.S. PATENT DOCUMENTS

| | | | |
|---|---|---|---|
| 3,556,310 A * | 1/1971 | Loukotsky et al. | 211/189 |
| 4,092,547 A * | 5/1978 | Ruppert | 307/113 |
| 6,215,653 B1 * | 4/2001 | Cochran et al. | 361/602 |
| 6,678,151 B2 * | 1/2004 | Costante | 361/602 |

\* cited by examiner

*Primary Examiner* — Zachary M Pape
(74) *Attorney, Agent, or Firm* — Malloy & Malloy, P.L.

(57) ABSTRACT

A modular substation feeder assembly comprising a substantially rigid and collapsible support frame is presented. In particular, the support frame of the present invention comprises a plurality of at least two members disposed in a movable or removable relation to one another and structured to dispose the support frame between the collapsed position and into the operative expanded position. The feeder assembly comprises a support stand cooperatively structured to support or house a recloser or circuit breaker. When the support frame is disposed in the collapsed position, the support stand is oriented at least partially within a internal clearance zone which is defined as an area free of electrical components, including insulators, cross bars, etc.

17 Claims, 5 Drawing Sheets

MODULAR SUBSTATION FEEDER ASSEMBLY

BACKGROUND OF THE INVENTION

1. Field of the Invention

The present invention is generally directed to an air-insulated substation feeder assembly comprising a modular and/or collapsible configuration in order to facilitate a substantial amount of preconstruction, preassembly, and pretesting off-site or otherwise in a factory prior to installation within a power system or grid.

2. Description of the Related Art

Power plants, generating stations and/or power stations are industrial facilities located around the country and the World which are specifically constructed or otherwise configured for the purpose of generating electrical power that is ultimately distributed to residential and commercial areas for consumption or use. In particular, the power plant typically includes or is connected to one or more transmission substations that convert the voltage of the generated power up to extremely high levels for long distance transmission on a transmission grid.

Before the power can be utilized in a home or business, the voltage must be stepped down from the transmission grid to the distribution grid. Once the voltage is stepped down into the distribution grid, the power can be distributed to the various homes or buildings via a power substation and/or a substation feeder. In particular, most power substations include one or more voltage transformers that are specifically configured to step the transmission voltages (typically in the range of 150,000 volts to 750,000 volts) down to a level (typically less than 10,000 volts) that is capable of being distributed to the end user at a residential home or commercial building. In addition to a number of electrical components, discussed below, the substations also include a transmission bus that is used to distribute the power off into multiple directions, and circuit breaker(s) and/or switch(es) that are used to disconnect the substation from the grid when desired or when necessary.

There are two main types of substations—gas-insulated substations ("GIS") and air-insulated substations ("AIS"). A gas-insulated substation is an electrical or power substation wherein the major components are housed in a sealed and controlled environment. Within such an environment, gas (e.g., sulfur hexaflouride) is used as the insulating medium. Gas-insulated substations are typically used in areas where the substation needs to be compact or otherwise occupy a relatively small area. As such, gas-insulated substations are generally found in highly populated and developed areas with very little room for larger, air-insulated substations. On the other hand, air-insulated substations use air as the insulating medium and the major components are exposed to the outer elements. In general, gas-insulated substations are more expensive than a similarly functioning or similarly rated air-insulated substation.

Moreover, air-insulated substations are typically assembled, constructed or otherwise built on-site in that all of the various electrical components, including various insulators, transformers, reclosers, circuit breakers, switches, bushings and the transmission bus are all connected and assembled at the desired location. Assembly of the substation is extremely laborious in nature and may take several weeks or even months to complete. Once assembled on-site, the various electrical components are tested or measured to make sure the subsystem is in working order. If it is not, the laborers must then troubleshoot the assembled substation on site in an attempt to locate the malfunctioning component(s), which may be virtually any component, including a malfunctioning transformer, cracked or broken insulator, loose bushing, etc. Depending upon the number and nature of the malfunctioning component(s) and the ease of fixing the malfunctions, the substation may not be ready for use for several additional days, weeks or even months. This process, of course, can cost a great deal of money once all of the components are finally installed and in general working order.

The proposed modular substation feeder assembly as described herein is intended to overcome these and other obstacles. In particular, because of the unique and novel configuration of the various components, the modular substation feeder assembly of the present invention is capable of being substantially preassembled in a factory or other off-site facility. This allows for testing and troubleshooting prior to disposition of the substation on-site, eliminating the unnecessary labor efforts in construction, assembly and testing on-site. The factory may also be used to preassemble or manufacture other components of the transmission and/or distribution grid, including recloser assemblies, transformers, transmission stations, switches, etc., thereby further reducing costs and time.

SUMMARY OF THE INVENTION

The present invention is generally directed to an air-insulated substation feeder assembly comprising a modular configuration in that it is disposable between a collapsed position and an operative extended position. Specifically, the modular substation feeder assembly of the various embodiments of the present invention comprises a support frame having a base, a plurality of upper supports and a plurality of lateral and/or substantially upright, side supports. The various embodiments further comprise an internal support stand structured to house, support or otherwise operatively maintain a recloser or circuit breaker. The various beams or supports of the present invention are made of a substantially rigid and study material such that additional internal supports, cross beams, or structures which may be found in other non-modular substations are not needed.

As will be described in greater detail below, the modular substation feeder assembly of the present invention can be substantially constructed, assembled and tested off-site. Furthermore, in order to facilitate shipping or transportation, the feeder assembly of the present invention is disposed in a shortened, collapsed position, and then assembled, installed and disposed into its operative expanded position on-site for use.

Specifically, the assembly or disposition of the modular substation feeder assembly from its collapsed position and into its operative expanded position can be accomplished in a matter of hours, which is a drastic improvement over the lengthy and laborious efforts involved in typical construction of the entire substation on-site. Furthermore, the ability to test the assembly off-site and in a controlled environment prior to installation on-site drastically reduces costs and time involved.

In at least one preferred embodiment, the lateral supports comprise a first, upper member and a removably disposed second, lower member. Accordingly, when the feeder assembly is disposed in the collapsed position for transportation, the first, upper member is connected directly to the base and the second, lower member is set aside or otherwise completely disconnected or removed from the base and the corresponding upper member.

Accordingly, disposition of the feeder assembly from the collapsed position and into the expanded position requires the upper member to be disconnected from the base. Once disconnected, the upper members can be raised or separated from the base so that the lower members can be fastened or secured into position.

In addition, the modular substation feeder assembly of the present invention comprises a plurality of electrical components, such as insulators, disposed in a spaced relation along the upper support of the support frame. The novel and unique configuration of the modular substation feeder assembly of the present invention comprises an internal clearance zone of a sufficient dimension to allow disposition of the internal recloser support stand at least partially there through when the modular substation feeder assembly is disposed in the shortened collapsed position. In particular, at least two adjacent insulators disposed on the upper support are separated a distance from one another which is at least slightly greater than the lateral dimension of the internal recloser support stand. Such a configuration allows the internal recloser support stand to be at least partially disposed between the adjacent insulators, which in turn, allows the support frame to be disposed in the shortened, collapsed position, as disclosed herein.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
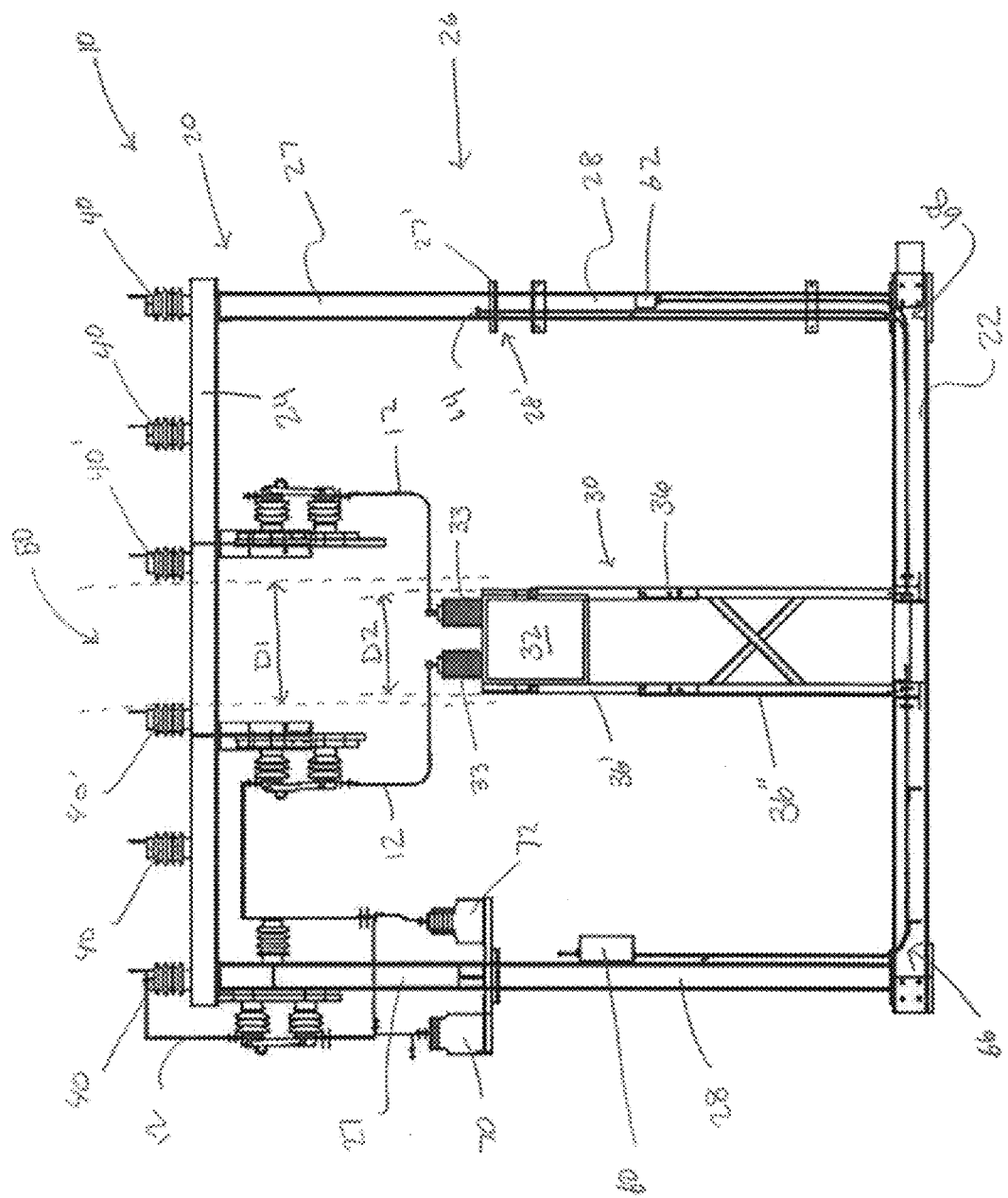
FIG. 1 is a side elevation view of the modular substation feeder assembly disposed in an operative, extended position as disclosed in accordance with at least one embodiment of the present invention.
Figure 2:
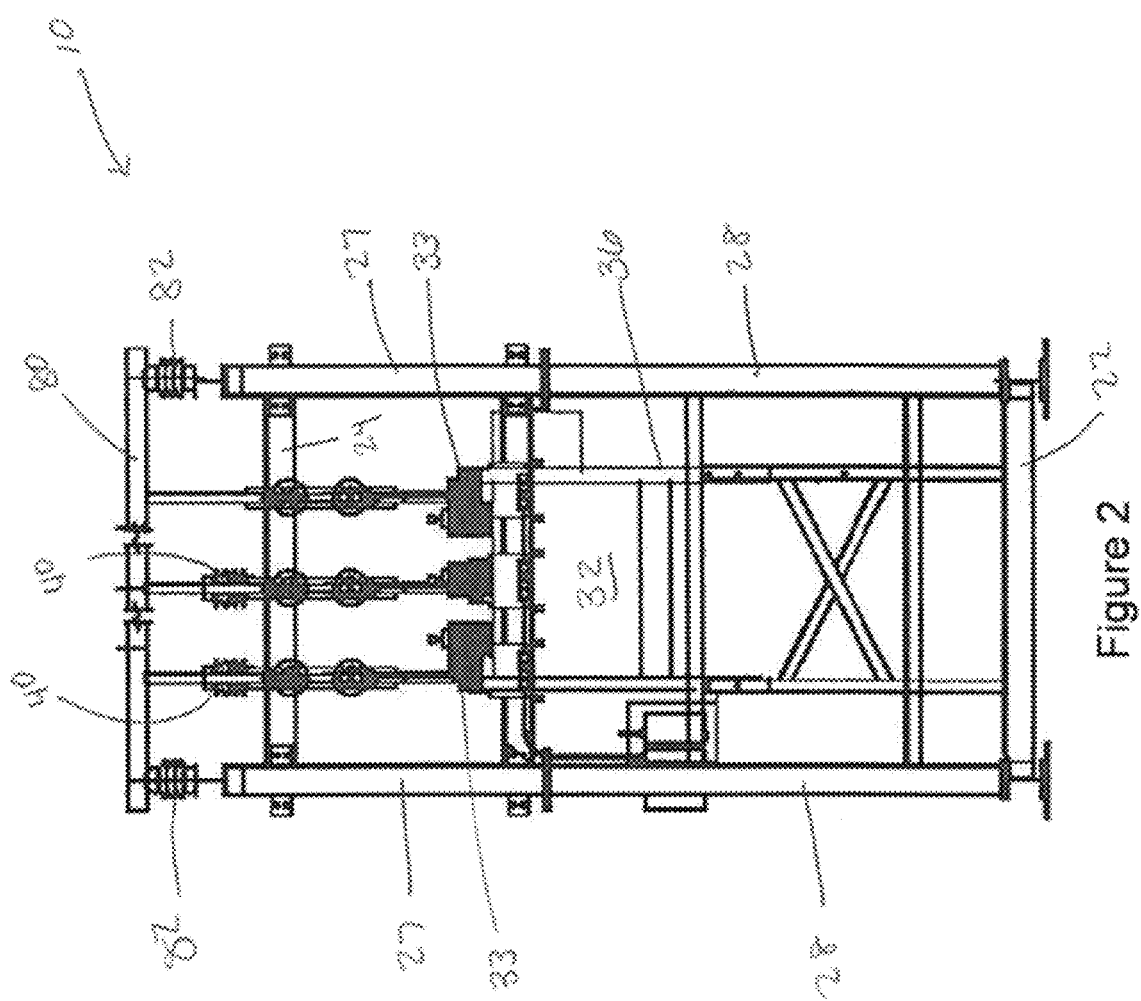
FIG. 2 is a front elevation view of the modular substation feeder assembly disposed in an operative, extended position illustrated in FIG. 1.

As illustrated in the accompanying figures, the present invention is directed to a modular substation feeder assembly, generally indicated as 10. In particular, the illustrated embodiment is an air-insulated substation (AIS) in that the high voltage transmission bus 12 is insulated by open air as opposed to being disposed in a controlled, compact environment and insulated by gas.

Specifically, the modular substation feeder assembly 10 of the various embodiments of the present invention comprises a substantially rigid and collapsible support frame 20 having a base 22, a plurality of upper supports 24 and a plurality of lateral and/or substantially upright, side supports 26. As also illustrated in FIGS. 1 through 4, the present invention comprises an internal support stand 30 structured to house, support or otherwise operatively maintain a recloser 32 or circuit breaker and/or cooperatively disposed bushings 33. In particular, the support stand 30 of at least one embodiment is disposed at least partially within the support frame 20 in that it is enclosed within the outer lateral supports 26 around its periphery, as can be seen from the top view illustrated in FIG. 5. Specifically, the substantially rigid nature of the supports 20, 22, 24, 26 eliminate the need for additional internal beams, supports, or structures that are commonly utilized in other non-modular substations.

Figure 3:
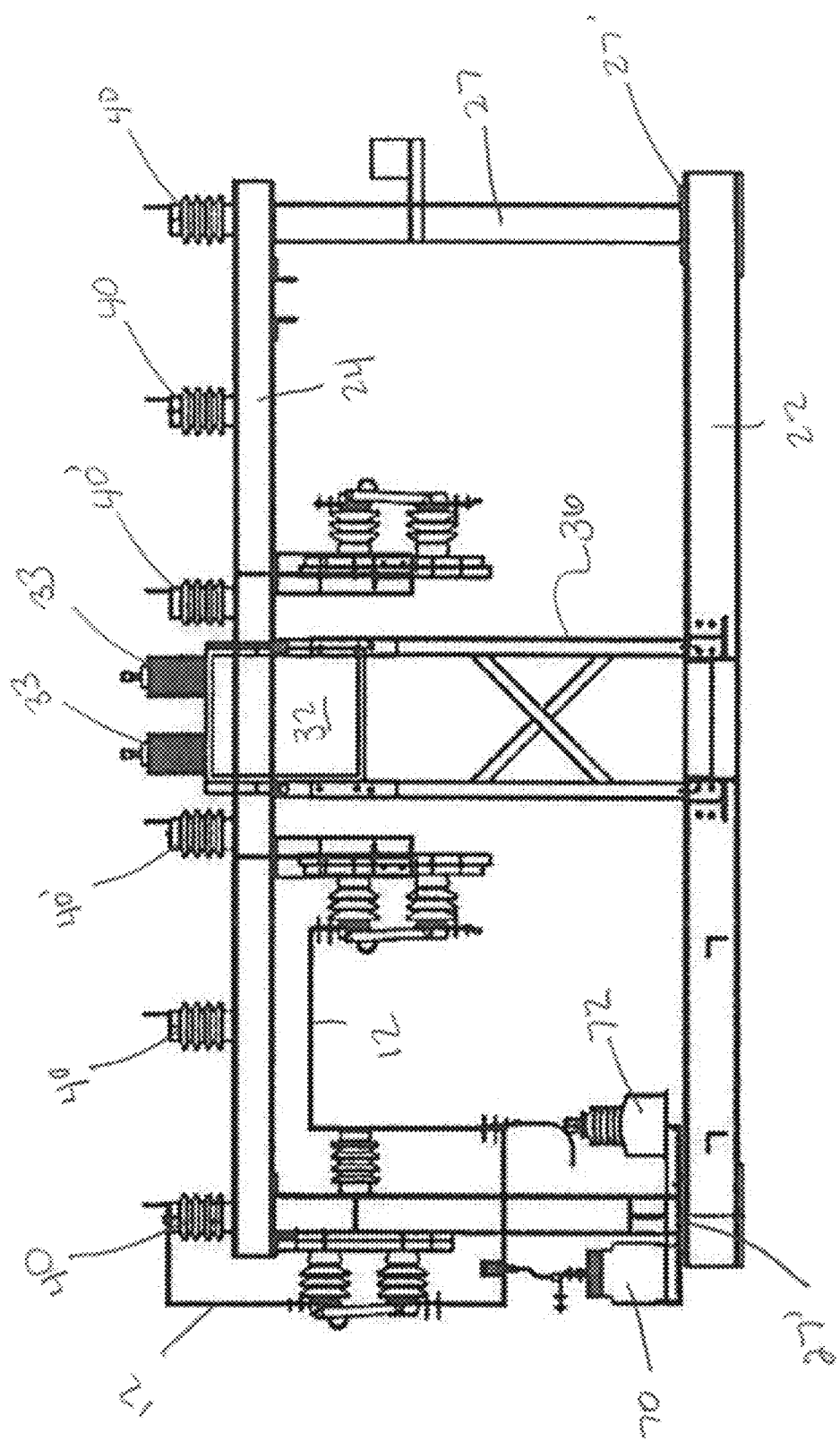
FIG. 3 is side elevation view of the modular substation feeder assembly disposed in a collapsed position.
Figure 4:
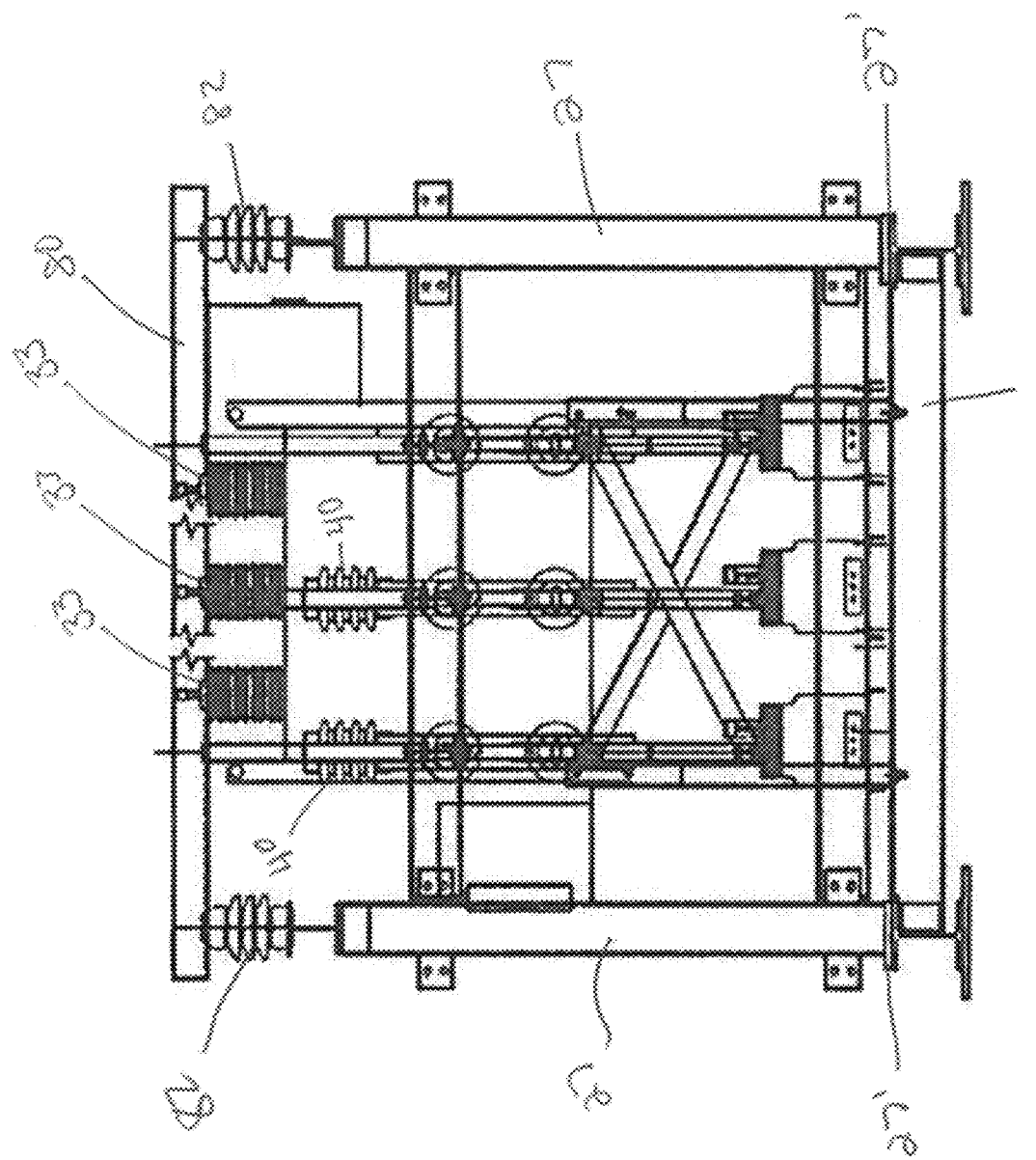
FIG. 4 is a front elevation view of the modular substation feeder assembly disposed in the collapsed position.
Figure 5:
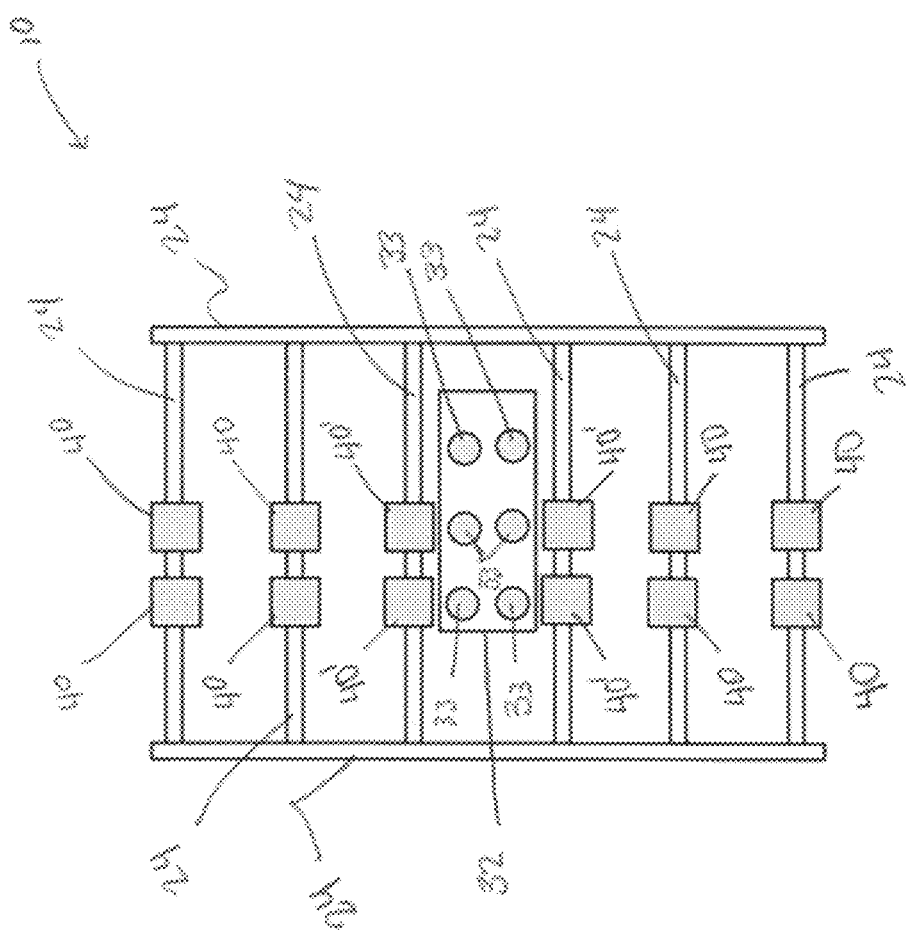
FIG. 5 is a top plan view of the modular substation feeder assembly of the present invention.

More in particular, the support frame 20 of the various embodiments is disposable between an operative, assembled and/or expanded position (illustrated in FIGS. 1 and 2) and a shortened, collapsed position (illustrated in FIGS. 3 and 4). Accordingly, as will be described in greater detail below, the modular substation feeder assembly 10 of the present invention can be substantially constructed off-site, tested off-site, shipped while disposed in the shortened, collapsed position, and then assembled, installed and disposed into its operative expanded position on-site for use. The assembly or disposition of the modular substation feeder assembly 10 from its collapsed position and into its operative expanded position can be accomplished in a matter of hours, which is a drastic improvement over the lengthy and laborious efforts involved in construction of the substation on-site, as described above. Furthermore, the ability to test the assembly off-site and in a controlled environment prior to installation on-site drastically reduces costs and time involved. For example, more sophisticated testing equipment and machinery may be used in the controlled off-site factory thereby eliminating unnecessary labor on-site during actual installation into the power grid.

Referring now to the assembled modular substation feeder assembly 10 illustrated in FIG. 1, the lateral supports 26 of at least one embodiment of the present invention each comprise a first upper member 27 connected to a second lower member 28. Specifically, the upper and lower members 27, 28 of at least one embodiment are movably and/or removably connected to one another via any one or more fasteners, including for example, pins, screws, bolts, etc.

For exemplary purposes only, the upper and lower members 27, 28 may, in at least one embodiment, be telescopically movable relative to one another in that disposition of the modular substation feeder assembly 10 of the present invention from the assembled or expanded position to the shortened collapsed position includes removing or loosening the fasteners and telescopically disposing the upper and lower members 27, 28 into one another. Similarly, disposition of the modular substation feeder assembly 10 of such an embodiment from the collapsed position and into the operative expanded position includes telescopically expanding upper and lower members 27, 28 from one another and tightening appropriate fasteners to secure the extended members 27, 28 in place.

However, in a preferred embodiment of the modular substation feeder assembly 10 of the present invention, the second, lower member 28 is removably disposed relative to the first, upper member 27 of a common lateral support 20. Accordingly, when the feeder assembly 10 of such an embodiment is disposed in the collapsed position (illustrated in FIGS. 3 and 4), the first, upper member 27 is connected directly to the base 22 and the second, lower member 28 (not illustrated in FIGS. 3 and 4) is set aside or otherwise completely disconnected or removed from the base 22 and the corresponding upper member 27. More in particular, when the feeder assembly is disposed in the collapsed position, a lower end 27' of the upper member 27 is connected to the base 22, for example, via one or more fasteners such as screws, pins, bolts, etc.

Accordingly, in at least one embodiment of the present invention, disposition of the feeder assembly 10, and in particular the support frame 20 thereof, from the collapsed position (illustrated in FIGS. 3 and 4) and into the expanded position (illustrated in FIGS. 1 and 2) requires the lower end 27' of the upper member 27 to be disconnected or disengaged from the base 22. Once the lower end 27' is disconnected, the upper support(s) 24 and the upper members 27 of the lateral supports 26 can be lifted up (for example, via a crane or other lifting machinery) while the base 22 remains in the desired location, for instance on the ground, concrete slab, or other designated spot. With the upper members 27 separated from the base 22, the lower members 28 can be put into position between the lower end 27' of each upper member 27 and the base 22. The lower members 28 are then each secured into place via appropriate fasteners such as screws, pins, bolts, etc. In particular, upper end 28' of lower member 28 is secured to lower end 27' of upper member 27. Of course the lower member 28 is also secured to the base in a similar manner.

In addition, the modular substation feeder assembly 10 of the present invention comprises a plurality of electrical components, such as insulators 40, disposed in a spaced relation along the upper support 24. In particular, the insulators 40 are structured to resist the flow of electric current therethrough and thus are used to support the high voltage transmission bus 12 without the current being transferred to the upper support 24 or other unintended portions of the feeder assembly 10. Each of the insulators 40 are typically disposed a fixed, equidistant and uniform separation from one another along the upper supports in order to maximize the efficiency of the insulators 40 and prevent unintended connection or shorting of the transmission bus 12 with other portions of the feeder assembly 10 including the support frame 20.

However, the novel and unique configuration of the modular substation feeder assembly 10 of the present invention comprises an internal clearance zone 50 of a sufficient dimension in order to allow disposition of the internal recloser support stand 30 at least partially there through when the modular substation feeder assembly 10, and in particular, the support frame 20 thereof, is disposed in the shortened collapsed position as illustrated in FIGS. 3 and 4. In particular, at least two adjacent and/or interior insulators 40' disposed on the upper support 24 are separated an expanded or greater distance D1 from one another (e.g. thirty-six inches) as compared to the separation from other insulators 40 disposed along the length of the upper support(s) 24. As illustrated, distance D1 is at least slightly greater than the lateral dimension D2 of the internal recloser support stand 30. The other insulators 40 disposed on the upper supports may be disposed a shorter distance from one another. Such a configuration allows the internal recloser support stand 30 to be at least partially disposed between the adjacent insulators 40', which in turn, allows the support frame 20 to be disposed in the shortened, collapsed position, as disclosed herein. Also, the additional spacing between the interior adjacent insulators 40' does not result in any loss of performance or increase of risk to an inadvertent malfunctioning of the system, such as via a short or connection of the transmission bus 12 with the support frame 20. In addition, and in order to further facilitate the increased spacing between interior adjacent insulators 40', the transmission bus 12 of the various embodiments of the present invention comprises a substantially flat configuration and may further comprise a much smaller profile or width than conventional round transmission busses. In particular, with the flat transmission bus 12, the insulators 40' supporting the bus 12 are able to be separated a greater distance thereby creating the clearance zone 50 identified above.

Additional structural features of at least one embodiment include a recloser support stand 30 with a telescopic, height-adjustable and/or movable frame assembly disposable between an operative, extended position (FIGS. 1 and 2) and a shortened collapsed position (FIGS. 3 and 4). For instance, the internal recloser support stand 30 of such an embodiment comprises first and second portions 36', 36" which are telescopically or otherwise disposed relative to one another such that the height of the support stand 30 may be extended and/or collapsed. As such, in at least one embodiment, the first and second portions 36', 36" may be adjusted to set the support stand 30 at an appropriate or extended height when the frame assembly 20 is disposed in the operative extended position. During shipment or transportation of the modular substation feeder assembly 10 of the present invention, the support stand 30 may be shortened or collapsed as appropriate. Locking screws, nuts, bolt or pins may be used to lock the first and second portions 36', 36" in the respective collapsed or extended positions.

Furthermore, in yet another embodiment, the present invention comprises additional auxiliary components such as a junction box 60, outlet and/or switch 62, and/or light fixture 64. One or more of these components 60, 62, 64 are collapsible or foldable, for instance, at pivot points 66 and/or 68. Accordingly, when stored or transported, the junction box 60, switch/outlet 62 and/or light fixture 64 may be disposed in a collapsed position by being folded or pivoted downward at pivot points 66, 68 and therefore at least partially parallel to the base 22. Of course, the components 60, 62, 64 may be removable or disposed on telescopic mounting posts to facilitate disposition into and out of an operative, extended position and a collapsed, shortened position.

Yet additional operative features of the present invention comprises a bypass bus 80 connected to the support frame 20 via appropriately positioned insulators 82, as generally illustrated in FIG. 4. The bypass bus 80 is used in order to bypass the various components of the module substation feeder assembly 10 of the present invention, including for example, the recloser or circuit breaker 32, current and/or voltage transformers 70, 72, etc.

As such, in order to dispose the modular substation feeder assembly 10 of the present invention from the collapsed position to the operative extended position, as described in detail above, upper members 27 are disengaged or disconnected from the base 22, and upper support 24 and upper members 27 are lifted up or otherwise separated from the base 22, such as via a crane or other lifting machinery. Lower members 28 are then installed and secured in place, as described above. The support stand 30 is then extended out into its operative position via telescoping, movable or adjustable support frame portions 36' and 36". Junction box 60, switch/outlet 62 and light fixture 64 are pivoted up and into their respective operative positions. Finally, transmission bus 12 is connected to the recloser or circuit breaker 32 via bushings 33, and the current and voltage transformers 70, 72, respectively, are connected to the transmission bus 12 if necessary.

Once the support frame 20 and each of the components are disposed in the operative position, the modular substation feeder assembly 10 of the various embodiments of the present invention is capable of be connected to the distribution grid and therefore able to distribute power to designated residential, industrial and/or commercial buildings or homes.

It should also be recognized that the various embodiments of the modular substation feeder assembly 10 of the present invention can be relocated or otherwise moved once it has been installed in a first location. For example, the feeder assembly 10 may be transported in a collapsed position to a first site where it is disposed into the expanded position and installed. Subsequently, the same feeder assembly 10 may be collapsed, transported to a second site, disposed into the expanded position again, and installed.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A modular substation feeder assembly, comprising:
a substantially rigid and collapsible support frame comprising a base, a plurality of lateral supports, and a plurality of upper supports,
said support frame further comprising a recloser support stand at least partially enclosed within said plurality of lateral and upper supports,
said support frame being disposable between an expanded position and a collapsed position,
each of said plurality of lateral supports comprising a first, upper member and a second, lower member, and
a plurality of electrical components disposed in a spaced relation along said plurality of upper supports,
wherein said plurality of electrical components and said plurality of upper supports are cooperatively disposed and configured to define an internal clearance zone, said recloser support stand being disposed at least partially within said internal clearance zone while said support frame is disposed in said collapsed position.

2. The modular substation feeder assembly as recited in claim 1 wherein said second, lower member of each of said plurality of lateral supports is movably disposed relative to said first, upper member.

3. The modular substation feeder assembly as recited in claim 2 wherein said second lower member is removably disposed relative to said first upper member and said base.

4. The modular substation feeder assembly as recited in claim 3 wherein each of said first, upper members of said plurality of lateral supports comprises a lower end connected to said base while said support frame is disposed in said collapsed position.

5. The modular substation feeder assembly as recited in claim 4 wherein said lower end of said first upper member is connected to an upper end of an adjacent one of said second lower members while said support frame is disposed in said expanded position.

6. The modular substation feeder assembly as recited in claim 1 further comprising a collapsible junction box assembly disposable between an operative, at least partially erect position and a collapsed position.

7. The modular substation feeder assembly as recited in claim 6 further comprising a collapsible switch assembly disposable between an operative, at least partially erect position and a collapsed position.

8. The modular substation feeder assembly as recited in claim 1 wherein said recloser support stand comprises a telescopic frame assembly disposable between an operative, extended position and a shortened collapsed position.

9. The modular substation feeder assembly as recited in claim 1 further comprising a substantially flat transmission bus connected to said plurality of electrical components.

10. The modular substation feeder assembly as recited in claim 1 wherein at least two adjacent ones of said plurality of electrical components disposed along said upper supports are spaced a distance of about thirty six inches to at least partially define said internal clearance zone.

11. A modular substation feeder assembly, comprising:
a substantially rigid and collapsible support frame,
said support frame comprising a base, a plurality of lateral supports, and a plurality of upper supports,
said support frame further comprising an internal support stand connected to said base, said internal support stand being at least partially enclosed within said plurality of lateral and upper supports,
said internal support stand comprising a telescopic frame disposable between an operative extended position and a shortened collapsed position,
said plurality of lateral supports being disposable between an operative expanded position and a collapsed position, and
a plurality of electrical components disposed on said plurality of upper supports,
at least two adjacent ones of said plurality of electrical components on said upper supports separated from one another a distance greater than a lateral dimension of said internal support stand, wherein said internal support stand is disposed at least partially between said two adjacent electrical components while said support frame is disposed in said collapsed position.

12. The modular substation feeder assembly as recited in claim 11 wherein each of said plurality of lateral supports comprises a first upper member and a second lower member.

13. The modular substation feeder assembly as recited in claim 12 wherein said second lower member of each of said plurality of lateral supports is removably disposed relative to said first upper member.

14. The modular substation feeder assembly as recited in claim 13 wherein said collapsed position of said plurality of lateral supports is defined as said second lower member being disconnected from said first upper member and said base, and a lower end of said first upper member being connected to said base.

15. The modular substation feeder assembly as recited in claim 11 further comprising a collapsible junction box assembly disposable between an operative, at least partially erect position and a collapsed position.

16. The modular substation feeder assembly as recited in claim 15 further comprising a collapsible switch assembly disposable between an operative, at least partially erect position and a collapsed position.

17. A modular air-insulated substation feeder assembly, comprising:
a substantially rigid and collapsible support frame comprising a base, a plurality of lateral supports, and a plurality of upper supports,
each of said plurality of lateral supports comprising a first upper member and a second lower member, said second lower member being removably connected to said first upper member and said base,
said support frame further comprising an internal recloser support stand at least partially enclosed within said plurality of lateral and upper supports, said internal recloser support stand being structured to support a recloser and a plurality of cooperatively disposed bushings,
said internal recloser support stand comprising an expandable frame assembly disposable between an operative extended position and a shortened collapsed position,
said support frame being disposable between an operative expanded position and a shortened collapsed position,
said shortened collapsed position of said support frame defined as said second lower member being disconnected from said first upper member and said base, and a lower end of said first upper member being connected to said base, and a plurality of insulators disposed in a spaced relation along said plurality of upper supports, wherein said plurality of insulators and said plurality of upper supports are cooperatively disposed and configured to define an internal clearance zone, said internal recloser support stand being disposed at least partially within said internal clearance zone while said support frame is disposed in said shortened collapsed position.

* * * * *